(12) United States Patent
Tachibana (10) Patent No.: US 7,447,864 B2
(45) Date of Patent: Nov. 4, 2008

(54) MEMORY AREA ALLOCATION CONTROL DEVICE FOR ALLOCATING TARGET INFORMATION TO FREE AREA OF MEMORY AREA, STORAGE MEDIUM STORING ITS PROGRAM AND ITS METHOD

(75) Inventor: Masaaki Tachibana, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 122 days.

(21) Appl. No.: 11/449,997

(22) Filed: Jun. 9, 2006

(65) Prior Publication Data

US 2007/0220229 A1    Sep. 20, 2007

(30) Foreign Application Priority Data

Mar. 16, 2006    (JP)    ............... 2006-073540

(51) Int. Cl.
*G06F 12/00* (2006.01)
*G06F 13/00* (2006.01)
*G06F 13/28* (2006.01)

(52) U.S. Cl. ....................... 711/171; 711/173
(58) Field of Classification Search ............. 711/170
See application file for complete search history.

(56) References Cited

U.S. PATENT DOCUMENTS 5,761,536 A * 6/1998 Franaszek ............. 710/68

6,643,754 B1 * 11/2003 Challenger et al. ......... 711/171

FOREIGN PATENT DOCUMENTS

FR    2774785 A1 *    8/1999
JP    05-324431    12/1993

OTHER PUBLICATIONS

"Quick Fit: An Efficient Algorithm for Heap Storage Allocation," Charles B. Weinstock et al., SIGPLAN Notices vol. 23 No. 10, Oct. 1988.*

* cited by examiner

*Primary Examiner*—Sanjiv Shah
*Assistant Examiner*—Mark A Giardino, Jr.
(74) *Attorney, Agent, or Firm*—Greer, Burns & Crain, Ltd.

(57) ABSTRACT

The memory area allocation control device for allocating target information to a free area of a memory area efficiently allocates a free area to target information to be requested by obtaining a request for allocating the target information to a free area, searches for the free area by a best fit method, according to the allocate request before exceeding the threshold address, retrieving the free area from an area after the threshold address by a first fit method if there is no free area in the retrieved area, allocating the target information to the retrieved free area and setting a final address in an area to which the target information has been allocated as a threshold address.

14 Claims, 11 Drawing Sheets

MEMORY AREA ALLOCATION CONTROL DEVICE FOR ALLOCATING TARGET INFORMATION TO FREE AREA OF MEMORY AREA, STORAGE MEDIUM STORING ITS PROGRAM AND ITS METHOD

BACKGROUND OF THE INVENTION

1. Field of the Invention

The present invention relates to a memory area allocation method in an information processing system.

2. Description of the Related Art

As a method for allocating data, a program or the like, to the free area of a memory space (area allocation method), according to a request from an operating system (OS), an application program, interrupt (external interrupt, exceptional interrupt or instruction interrupt) or the like, a first fit method for allocating the first found allocable memory space and a best fit method for allocating an optimal free area for necessary memory after checking all free areas are well known.

For example, in Japanese Patent Application Publication No. H5-324431, a data area is polarized and allocated in order to efficiently manage memory by minimizing the fragmentation of the free area in internal memory. As its method, a method using the best fit mode and a method using a first fit mode are disclosed.

Figure 1:
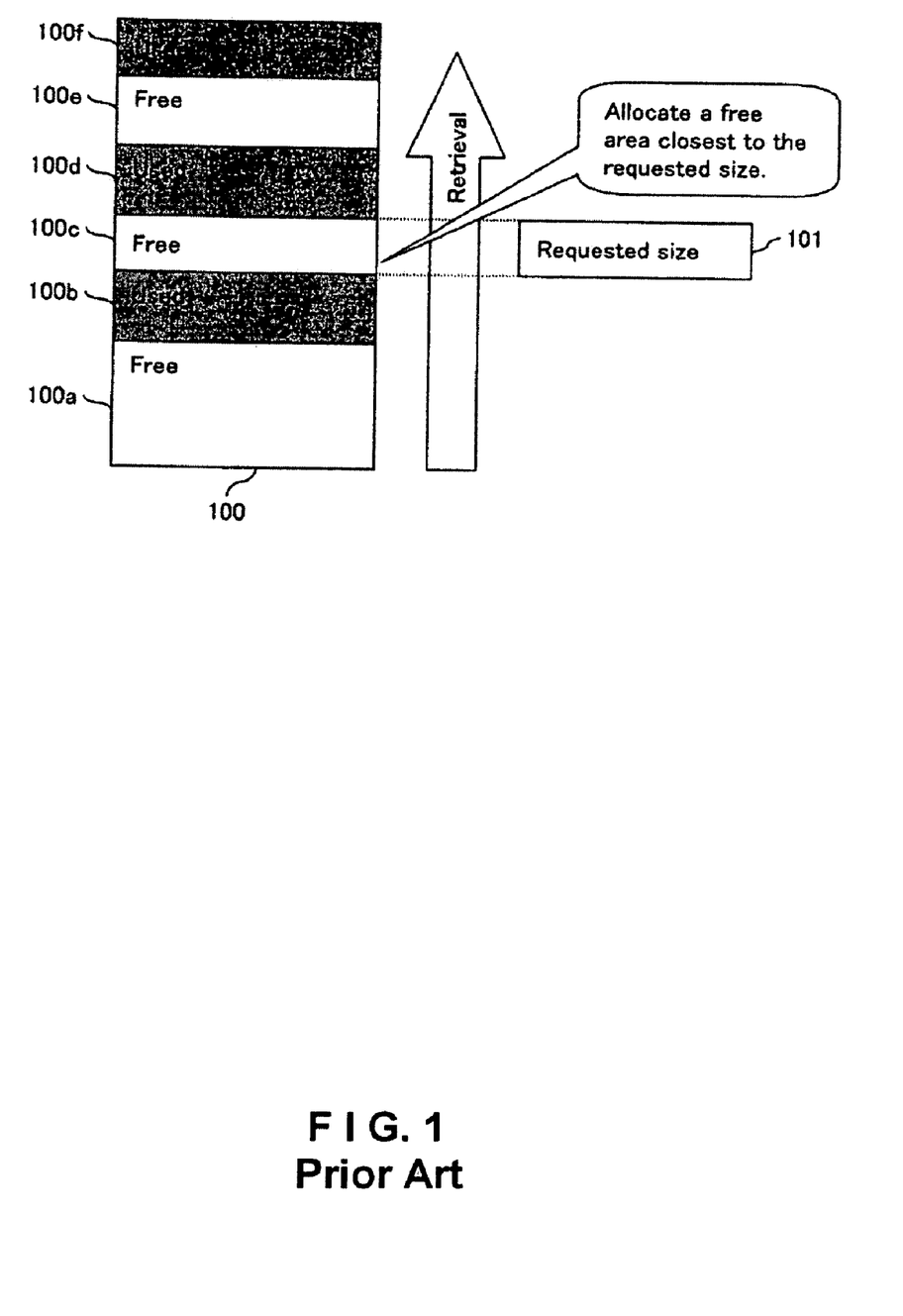
FIG. 1 explains the best fit method.

FIG. 1 explains the best fit method. FIG. 1 shows the memory allocation idea in which used areas 100b, 100d and 100f and free areas 100a, 100c and 100e are mixed. The best fit method allocates a free area closest to a requested size. The requested size is the size of data, a program or the like to be allocated to a free area according to the above-described request.

FIG. 1 shows the case where data 101 is allocated to memory 100. In this case, the memory 100 is retrieved from top to bottom. After retrieving all areas, free areas 100a, 100c and 100e are found. The data 101 is allocated to the smallest free area 100c of free areas with a size sufficient to store the data 101 to allocate.

By using this method, the fragmentation of an area can be suppressed and the area can be efficiently allocated.

Figure 2:
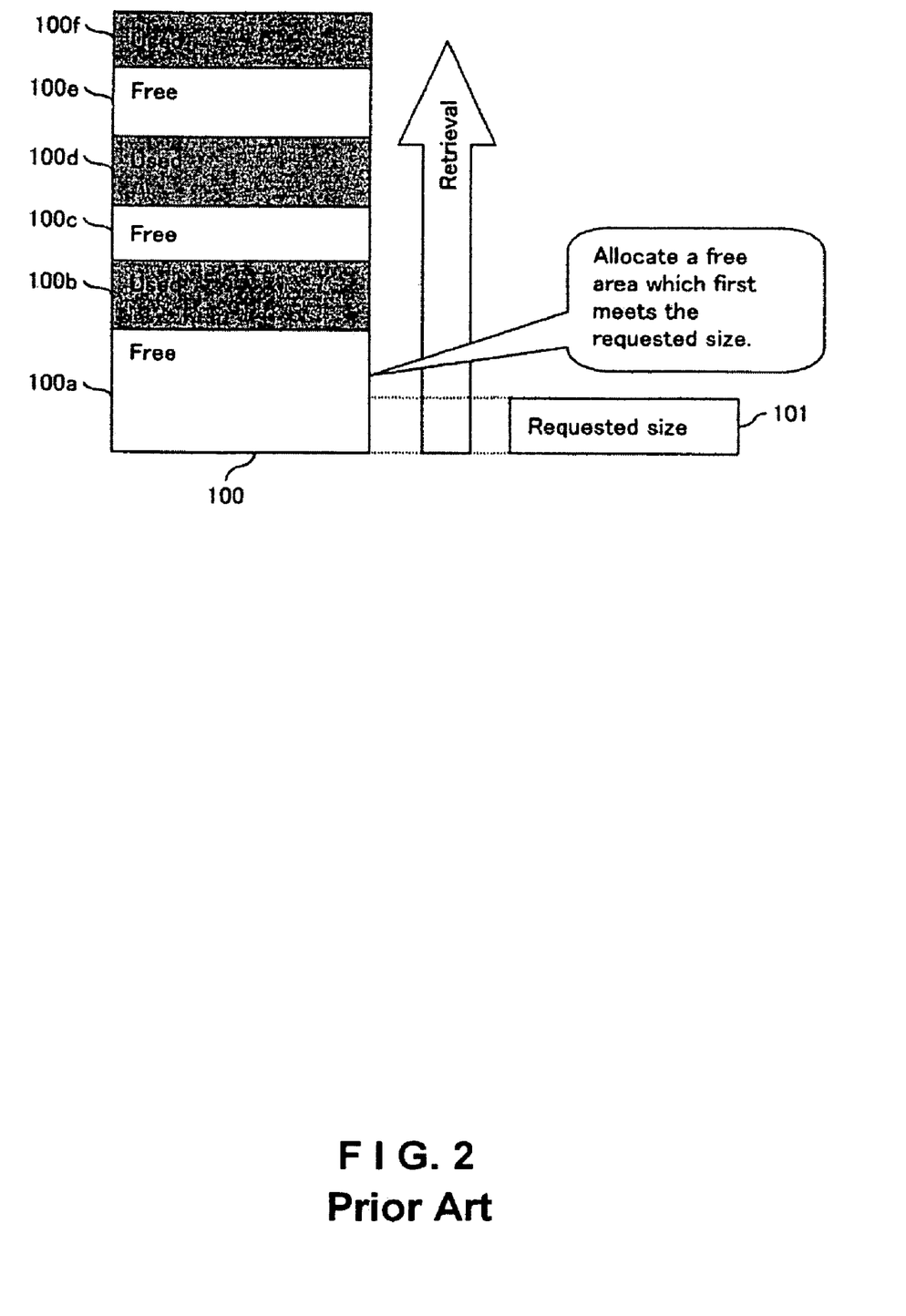
FIG. 2 explains the first fit method.

FIG. 2 explains the first fit method. FIG. 2 shows the memory allocation idea in which used areas 100b, 100d and 100f and free areas 100a, 100c and 100e are mixed. The first fit method allocates an area first meeting a requested length (requested size) of free areas arranged in addresses order.

FIG. 2 shows the case where the data 101 is allocated to the memory 100. In this case, the memory 100 is retrieved from top to bottom. The data 101 is allocated to the first found free area 100a with a size sufficient to store the data 101 to allocate.

This method emphasizes its retrieval speed. This first fit method has a characteristic of allocating a free space close to the retrieval starting direction. Therefore, by providing a mechanism for retrieving from both low/high directions, an area to be used can be divided according to its usage, thereby preventing the memory area breakdown.

As described above, in Japanese Patent Application Publication No. H5-324431, an allocable free area is searched for from a higher-order area or a lower-order area in the first fit mode or the best fit mode, according to its usage.

However, in the case of the first fit mode, sometimes a larger memory space than a necessary memory space is allocated and there is a problem in the efficiency in use of an area to be used. In the case of best fit mode, it takes too much time since all free areas are checked once.

Furthermore, if in a memory space, an area for storing a program or the like, and an area for storing data or the like are mixed and located, the efficiency in use of memory degrades, which is a problem from the viewpoints of the difference in information characteristic, such as an area size, life or the like. Japanese Patent Application Publication No. H5-324431 has a problem that free areas are scattered in a toothless shape although the memory area is polarized allocated.

As described above, the prior art has both merits/demerits, and there is no allocation method utilizing only the merits of both the methods.

SUMMARY OF THE INVENTION

It is an object of the present invention to efficiently allocate a free area to target information to be stored in order to solve the above-described problems. It is another object of the present invention to use an area according to its usage.

According to the present invention, a memory management system for allocating target information to a free area of a memory area, comprising:

an allocate request acquisition unit for obtaining a request for allocating the target information to the free area;

a threshold address storage unit for storing a predetermined address as a threshold address;

a free area retrieval unit for searching for the free area before exceeding a threshold address stored in the threshold address storage unit, by a best fit method, according to the allocate request and retrieving it from an area after the threshold address by a first fit method if there is no free area in the retrieved area;

an allocation unit for allocating the target information to the free area searched for by the free area retrieval unit; and a threshold address setting unit for setting a final address in the area to which the allocation unit has allocated the target information, in the threshold address storage unit as the threshold address.

According to the present invention, a storage medium on which is recorded a memory area allocation control program for enabling a computer to execute a memory management process for allocating target information to a free area of a memory area, the process comprising:

an allocate request acquisition process for obtaining a request for allocating the target information to the free area;

a free area-retrieval process for searching for the free area before exceeding a prescribed threshold address as a threshold address by a best fit method, according to the allocate request and retrieving it from an area after the threshold address by a first fit method if there is no free area in the retrieved area;

an allocation process for allocating the target information to the free area searched for by the free area retrieval process; and a threshold address setting process for setting a final address in an area to which the target information has been allocated by the allocation process as the threshold address.

According to the present invention, a memory area allocation control method for allocating target information to a free area of a memory area, comprising:

obtaining a request for allocating the target information to the free area;

searching for the free area before exceeding a prescribed threshold address as a threshold address by a best fit method, according to the allocate request and retrieving the free area from an area after the threshold address by a first fit method if there is no free area in the retrieved area;

allocating the target information to the retrieved free area; and setting a final address in an area to which the target information has been allocated the allocation process as the threshold address.

DESCRIPTION OF THE PREFERRED EMBODIMENTS

The memory area allocation control device of the present invention, for allocating target information to the free area of a memory area comprises an allocate request acquisition unit for obtaining a request for allocating the target information to the free area, a threshold address storage unit for storing a predetermined address as a threshold address, a free area retrieval unit for searching for the free area before exceeding the threshold address stored in the threshold address storage unit, by the best fit method, according to the allocate request and retrieving the free area from an area after the threshold address by the first fit method if there is no free area in the retrieved area, an allocation unit for allocating the target information to the free area searched for by the free area retrieval unit and a threshold address setting unit for setting the final address in the area to which the allocation unit has allocated the target information in the threshold address storage unit as the threshold address.

By such a configuration, target information can be efficiently allocated to a free area.

The memory area allocation control device can further comprise a retrieval direction determination unit for determining whether the allocate request obtained by the allocate request acquisition unit is a first allocate request for storing the target information in one end side of the memory or a second allocate request for storing the target information in the other end side.

By such a configuration, an allocation place can be separated according to its usage.

In the memory area allocation control device, if the final address in the area to which the allocation unit has allocated the target information exceeds the threshold address, the threshold address setting unit stores the final address in the threshold address storage unit as a threshold address.

By such a configuration, the final address in the already allocated area (also including the currently allocated area) can be set as a threshold address.

The summary of the present invention is as follows. It is determined from which memory should be allocated according to the usage of a memory space, its higher-order or lower-order area. Then, an allocable area is searched for in the best fit mode from the higher-order or lower-order area up to a prescribed area (including the already allocated area). If an allocable area is not found from the higher-order or lower-order area up to the area, after that an allocable area is searched for in the first fit mode.

Figure 3:
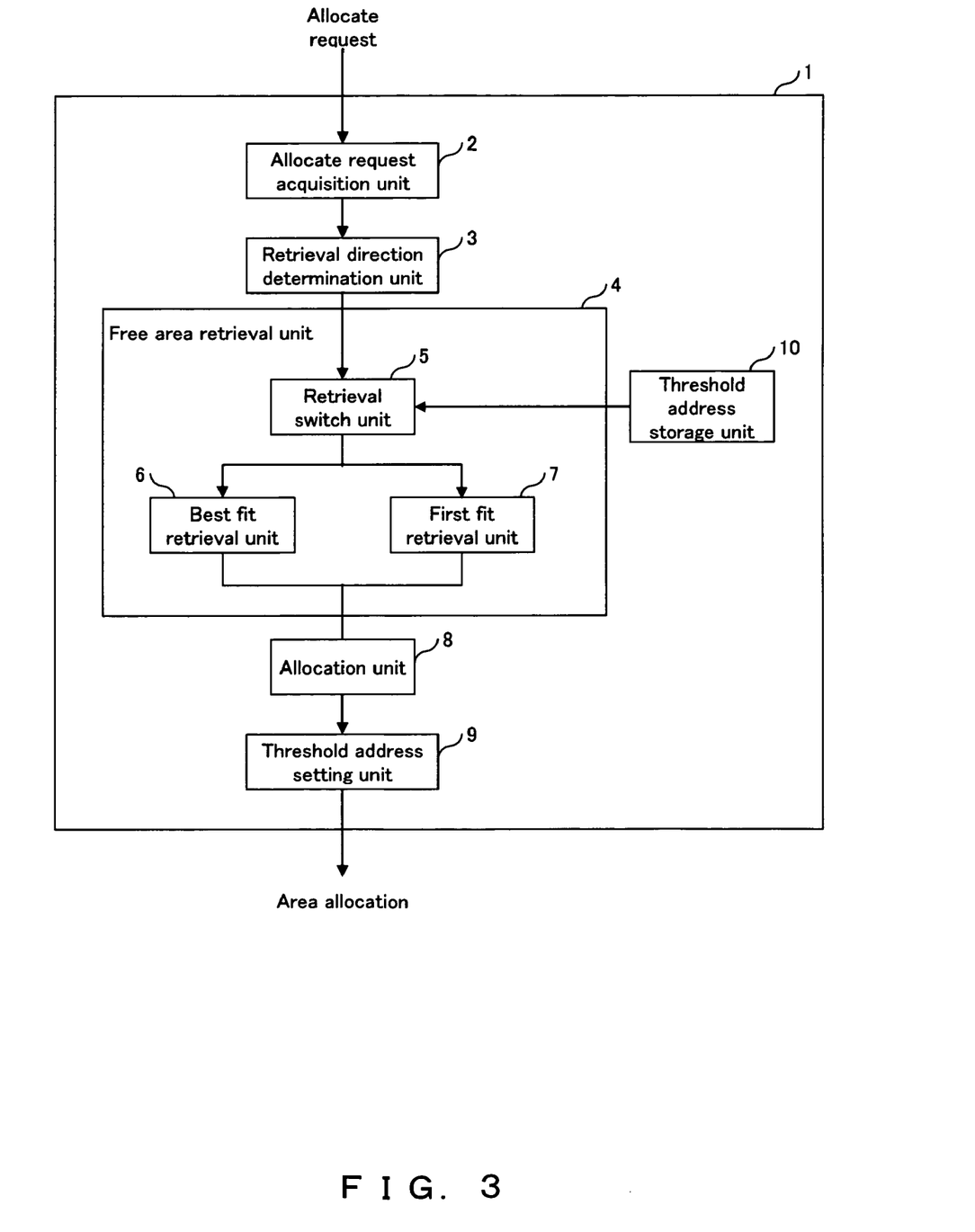
FIG. 3 shows the basic configuration of the memory area allocation control device of the present invention.

FIG. 3 shows the basic configuration of the memory area allocation control device of the present invention. The memory area allocation control device 1 allocates target information (for example, a program, data, etc.) to the free area of a memory area. The memory area allocation control device 1 comprises an allocate request acquisition unit 2, a retrieval direction determination unit 3, a free area retrieval unit 4, an allocation unit 8, a threshold address setting unit 9 and a threshold address storage unit 10.

The allocate request acquisition unit 2 obtains a request for allocating target information in the free space of memory (allocate request). The threshold address storage unit 10 stores a prescribed address (threshold address).

The retrieval direction determination unit 3 determines which the allocate request obtained by the allocate request acquisition unit 2 is, a request (first allocate request) for storing the target information in one end side (for example, the high address side) of the memory or a request (second allocate request) for storing the target information in the other end side (for example, the low address side.).

The free area retrieval unit 4 searches for a free area before exceeding the threshold address by the best fit method, according to the allocate request and if there is no free area in the retrieved range, it searches for it from an area after the threshold address by the first fit method.

The free area retrieval unit 4 comprises a retrieval switch unit 5, a best fit retrieval unit 6 and a first fit retrieval unit 7. The best fit retrieval unit 6 searches for a free area by the best fit method. The first fit retrieval unit 7 searches for a free area by the first fit method. The retrieval switch unit 5 drives the best fit retrieval unit 6 before exceeding the threshold address, according to the allocate request and drives the first fit retrieval unit 7 when exceeding this threshold address.

If the retrieval direction determination unit 3 determines that the allocate request is the first allocate request, the free area retrieval unit 4 searches for a free area, for example, from the high address side toward the low address side. If, for example, the retrieval direction determination unit 3 determines that the allocate request is the second allocate request, the free area retrieval unit 4 searches for a free area, for example, from the low address side toward the high address side.

The allocation unit 8 allocates the target information to the free area searched for by the free area retrieval unit 4.

The threshold address setting unit 9 stores a final address in the area to which the allocation unit 8 has allocated the target information as a threshold address if the final address exceeds the threshold address.

Specifically, if the lowest-order address in the area to which the target information has been allocated is below the threshold address when a free area is searched for from the high address side toward the low address side and the target information is allocated to the area, the threshold address setting unit 9 stores the lowest-order address in the threshold address storage unit 10 as a threshold address.

If the highest-order address in the area to which the target information has been allocated exceeds the threshold address when a free area is searched for from the low address side toward the high address side and the target information is allocated to the area, the threshold address setting unit 9 stores the highest-order address in the threshold address storage unit 10 as a threshold address.

As described above, the present invention provides a mechanism for searching for a free area from both low/high address sides. If the free area is allocated from the low address side, the highest-order address is stored. If the free area is allocated from the high address side, the lowest address is stored.

When searching for a free area, the range up to the stored address is retrieved by the best fit method, and an area after that is retrieved (allocated) by the first fit method.

Figure 4:
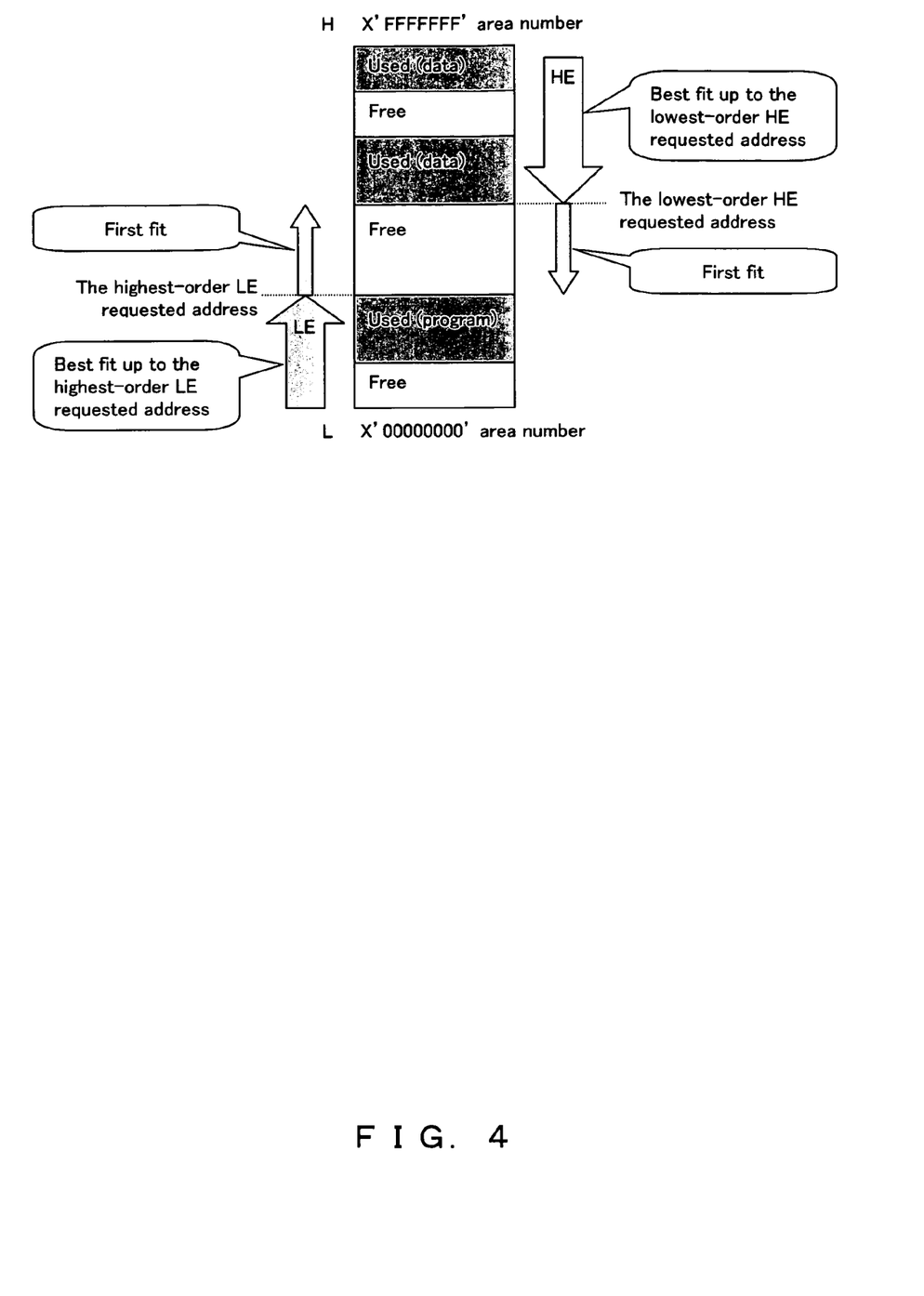
FIG. 4 explains the memory arrangement idea in the description of the area allocation method of the preferred embodiment.

FIG. 4 explains the memory arrangement idea in the description of the area allocation method of the preferred embodiment. In this preferred embodiment, as an example, a program is stored near in the low address side of the memory area and data is stored near in the high address side.

It is because of avoiding the mixture of memory areas with different characteristics, such as size, life or the like that an area for storing a program and the like and an area for storing data are divided and separated (into the high/low address sides) in a memory space in this way.

Since as to a size of memory area allocated to target information, each memory area with almost the same size as data is obtained, the fragmentation of memory can be minimized even when the release and acquisition of memory is repeated. If the mixture of different memory areas is permitted, as to a life of memory area allocated to target information, the release and acquisition of a memory area with a short life must be repeated between a memory area with a long life. Therefore, from this point of view, the fragmentation of memory can also be suppressed by polarizing a memory area.

By changing an allocation place according to its usage in this way, area breakdown can be avoided. For example, by arranging a data and program areas on the high and low address sides, respectively, the breakdown of the program area by an illegal writing into the data area can be prevented.

Then, FIG. 4 is described. The following symbols in FIG. 4 represent the following contents.

H: High address side (X' FFFFFFFF' area number)
L: Low address side (X' 00000000' area number)
HE: Allocate request from the high address side
LE: Allocate request from the low address side The lowest-order HE requested address: the lowest address allocated from the high address side (area number) The highest-order LE requested address: the highest address allocated from the low address side (area number)

An example of the allocate request from the low address side (LE) is described below. A program to be allocated to a free area is called a "target program". When there is a request (LE) for searching for a free area from the low address side and allocating the area to a target program, retrieval is performed from the low address side (L) toward the high address side (H).

In this case, in a range from the low address side (L) up to the highest-order LE requested address, a free area closest to the requested size is allocated to the target program (best fit). Thus, its fragmentation can be suppressed.

If the "highest-order LE requested address" is exceeded (there is no free area meeting the HE requested size in the range), a free area first meeting the requested size is allocated to the target program (first fit).

Thus, a request for searching for a free area from the low address side and allocating the area to the target program can be met. Furthermore, since mixture of an allocation area from the low address side and an allocation area from the high address side can be prevented, area breakdown can be prevented.

Next, an example of the allocate request from the high address side (HE) is described. A data to be allocated to a free area is called a "target data". When there is a request (LE) for searching for a free area from the high address side and allocating the area to a target data, retrieval is performed from the high address side (H) toward the low address side (L).

In this case, in a range from the high address side (H) up to the lowest-order HE requested address, a free area closest to the requested size is allocated to the target data (best fit) Thus, its fragmentation can be suppressed.

If the "lowest-order HE requested address" is exceeded (there is no free area meeting the requested size in the range), a free area first meeting the requested size is allocated to the target data (first fit).

Thus, a request for searching for a free area from the high address side and allocating the area to the target data can be met. Furthermore, since mixture of an allocation area from the high address side and an allocation area from the low address side can be prevented, area breakdown can be prevented.

Figure 5A:
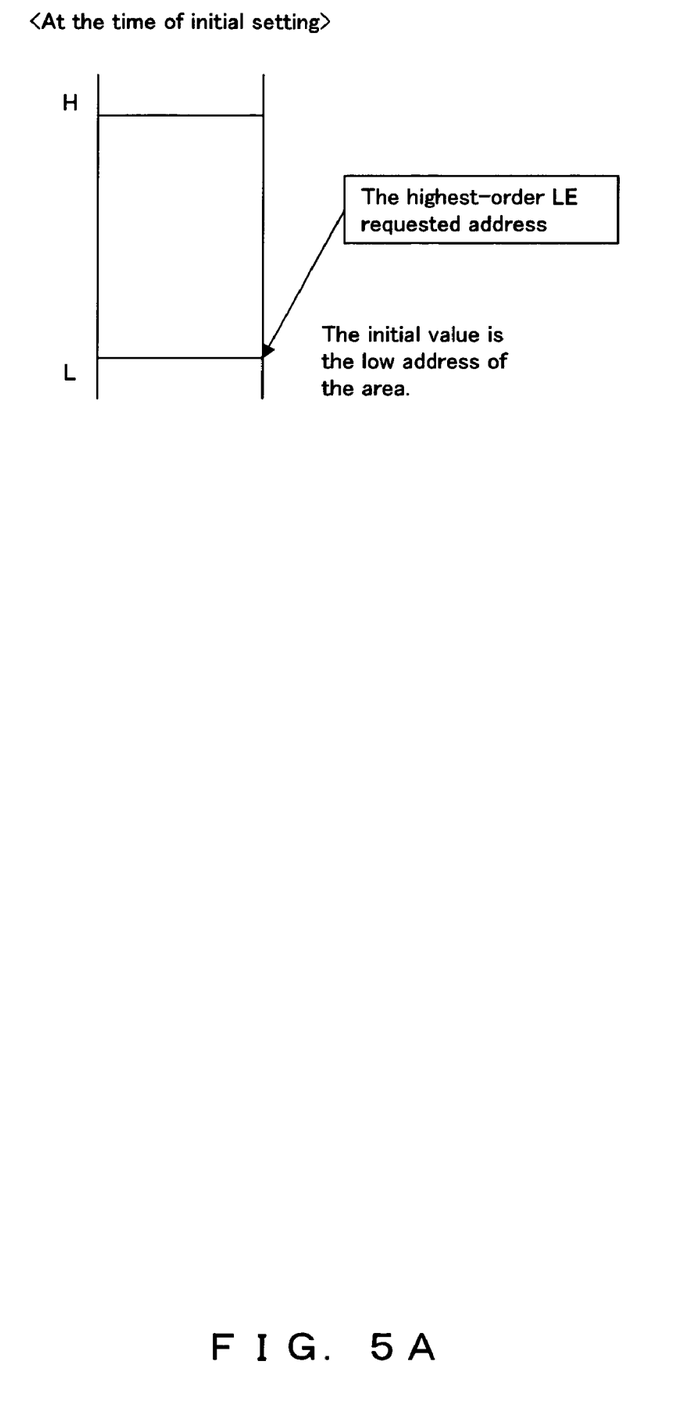
FIG. 5A shows the highest-order LE requested address at the time of the initial setting in the preferred embodiment.
Figure 5B:
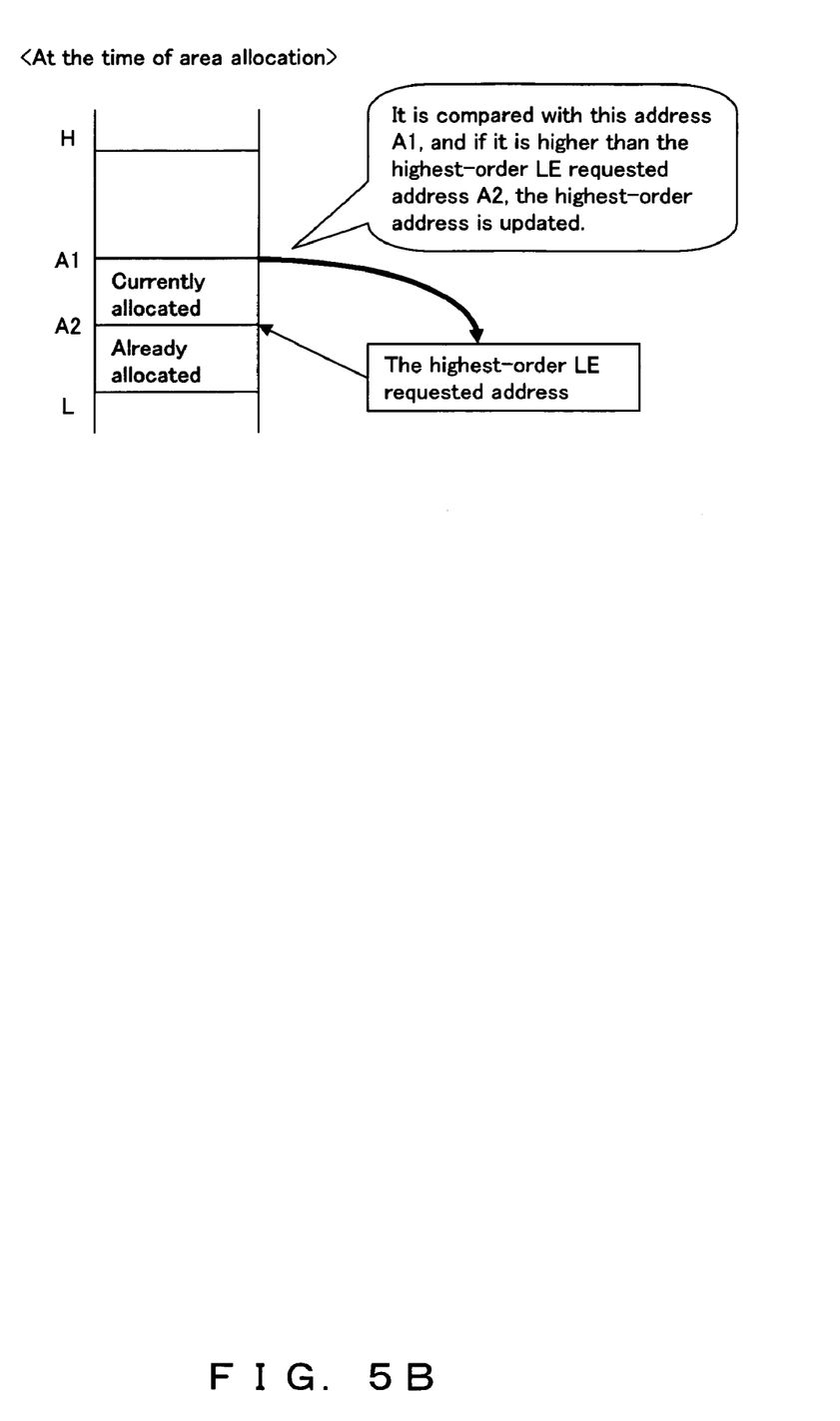
FIG. 5B shows the highest-order LE requested address at the time of area allocation in the preferred embodiment.

Next, the respective settings of the lowest-order HE requested address and highest-order LE requested address are described by FIG. 5A and FIG. 5B.

FIG. 5A shows the highest-order LE requested address at the time of the initial setting in the preferred embodiment. FIG. 5B shows the highest-order LE requested address at the time of area allocation in the preferred embodiment. For example, in the case of an LE requested, at the time of initial setting, the low address of the memory area is set as an initial value in the highest-order LE requested address. In FIG. 5A, "X'00000000'" is stored as the initial value of the highest-order LE requested address.

Then, there is an allocate request (LE request). If a free area is allocated to the target program in response to the LE request, the high address A1 of the allocated area and the highest-order LE requested address A2 are compared. If as a result of the comparison, the currently allocated address A1 is higher, the highest-order LE requested address A2 is updated by the high address Al of the allocated area.

If as the comparison result, the currently allocated address A1 is lower (a toothless area is allocated), the highest-order LE requested address A2 is not updated.

In the case of an HE requested, it is reversed. Specifically, in the case of an HE requested, at the time of initial setting, the highest address of the memory area is set as an initial value in the lowest-order HE requested address. In FIG. 4, "X' FFFFFFFF'" is stored as the initial value of the lowest-order HE requested address.

Then, there is an allocate request (HE request). If a free area is allocated to the target data in response to the HE request, the low address A1 of the allocated area and the lowest-order HE requested address A2 are compared. If as a result of the comparison, the currently allocated address A1 is lower, the lowest-order HE requested address A2 is updated by the low address A1 of the allocated area.

If as the comparison result, the currently allocated address A1 is higher (a toothless area is allocated), the lowest-order HE requested address A2 is not updated.

Thus, the lowest-order HE requested address and the highest-order LE requested address change at the time of area allocation.

Figure 6:
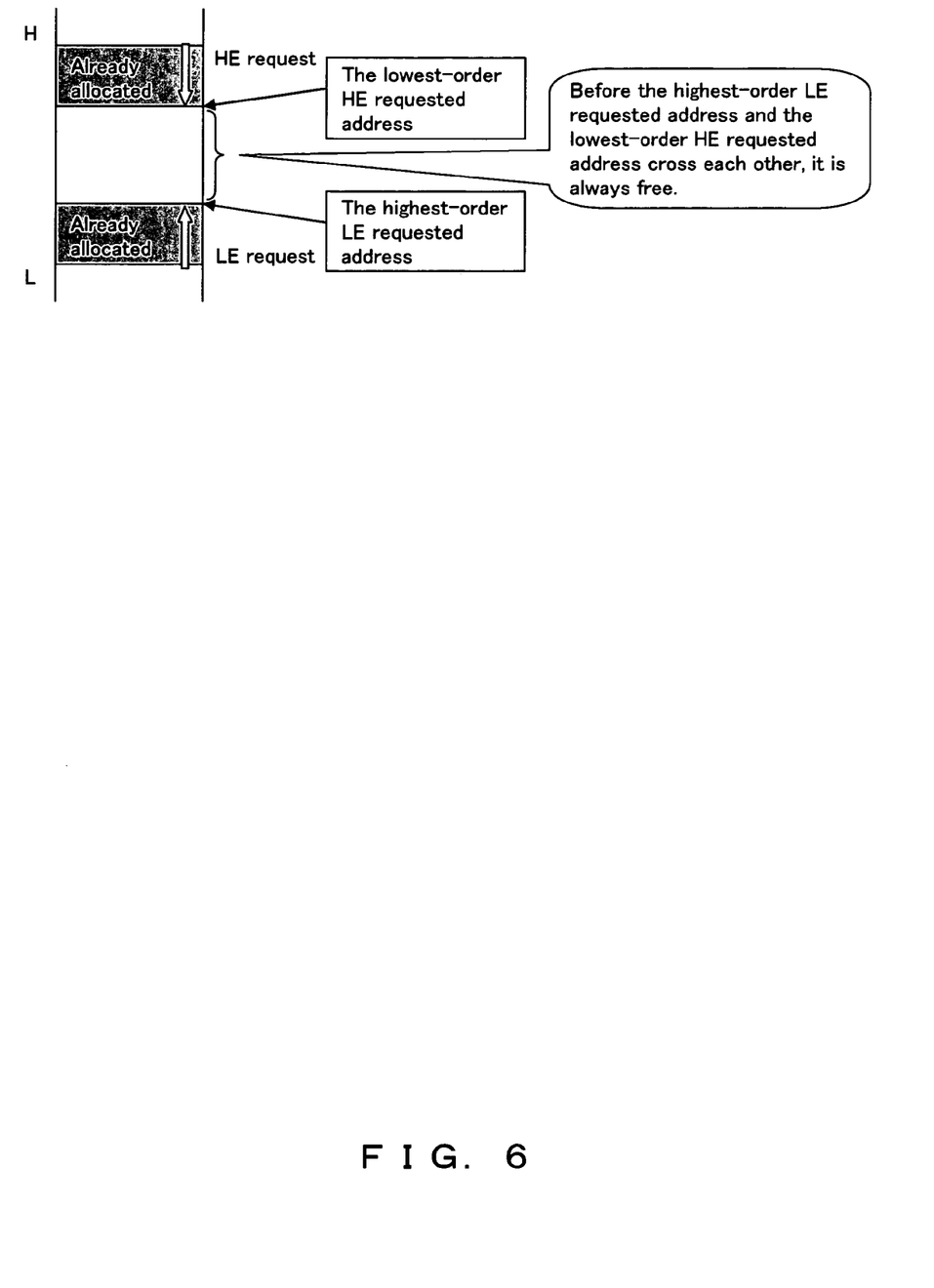
FIG. 6 shows the allocate request from the high address side (HE) and the allocate request from the low address side (LE) in the preferred embodiment.

FIG. 6 shows the allocate request from the high address side (HE) and the allocate request from the low address side (LE) in the preferred embodiment. As shown in FIG. 6, in the case of an HE requested, a free area continues to be allocated to the target data from the H (high address) side toward the L (low address) side. In this case, the lowest address in the already allocated area (including a previously allocated area) is stored in the lowest-order HE requested address.

In the case of an LE requested, a free area continues to be allocated to the target data from the L (low address) side toward the H (high address) side. In this case, the highest address in the already allocated area (including a previously allocated area) is stored in the highest-order LE requested address.

Thus, the lowest-order HE requested address and the highest-order LE requested address continue to be updated by piling the already allocated area at the time of area allocation. Therefore, before the lowest-order HE requested address and the highest-order LE requested address cross each other, an area between the lowest-order HE requested address and the highest-order LE requested address becomes a free area.

Figure 7:
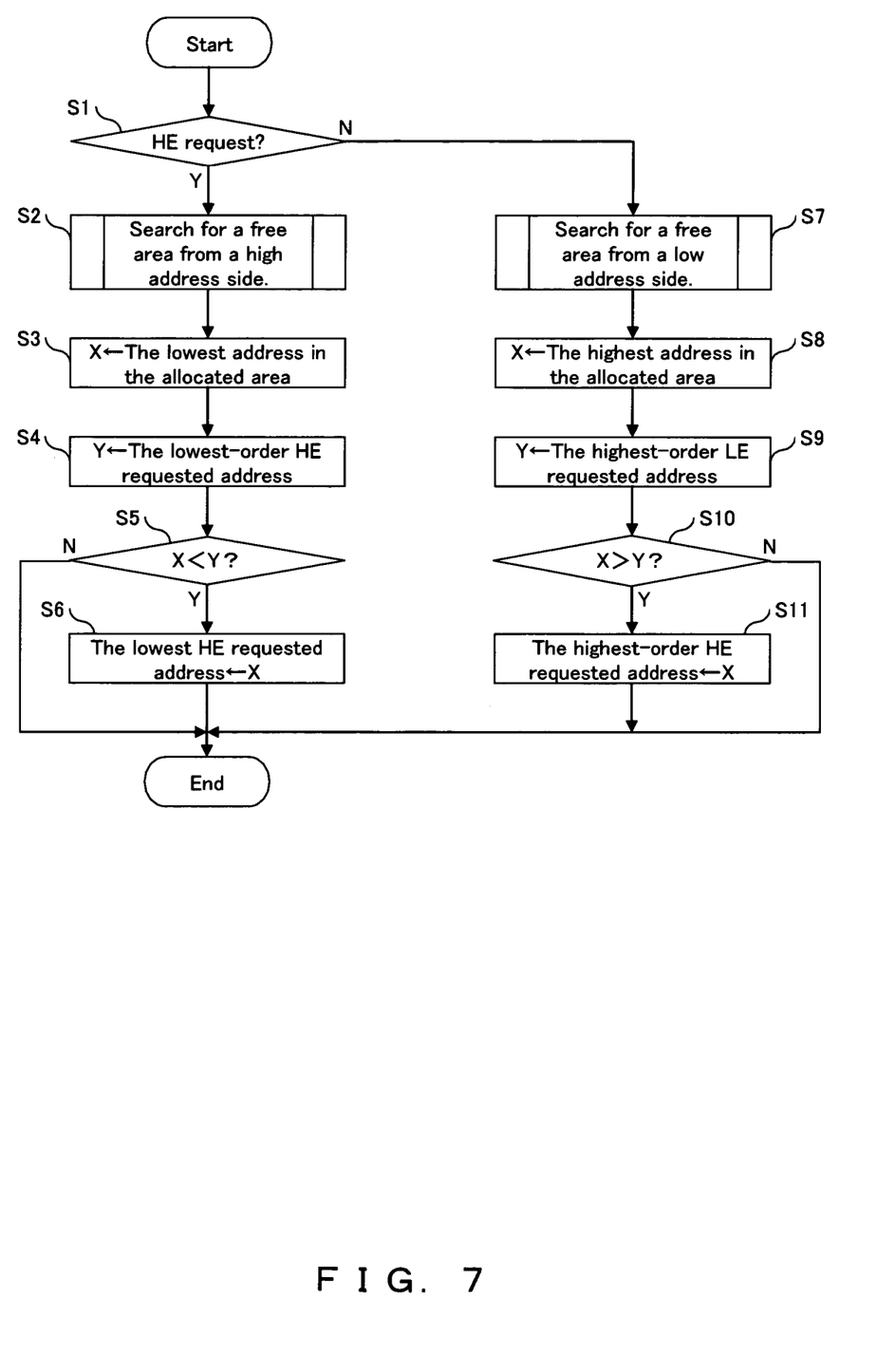
FIG. 7 shows the determination flow of the lowest-order HE requested address and the highest-order LE requested address in the preferred embodiment.

FIG. 7 shows the determination flow of the lowest-order HE requested address and the highest-order LE requested address in the preferred embodiment.

The flow is executed by the control unit of an information processing device. When receiving an allocate request, the control unit performs the following process. It is assumed that the initial values of the lowest-order HE requested address and the highest-order LE requested address are X'FFFFFFFF' and X'00000000', respectively.

Firstly, it is determined whether an allocate request is HE (step 1, hereinafter a step is omitted as "S"). If the allocate request is HE (yes in step S1), a free area is searched for from the high address side (S2). The details of S2 are described later.

Then, the lowest address of an area allocated in S2 is stored in a variable X (S3). The lowest-order HE requested address is stored in a variable Y (S4).

Then, the variables X and Y are compared (S5). If X<Y (yes in S5), specifically the lowest-order address of the allocated area exceeds the lowest-order HE requested address, the value of the variable X (the lowest-order address of the allocated area) is stored in the lowest-order HE requested address (S6).

If X≧Y (no in S5), specifically the lowest-order address of the allocated area does not exceed the lowest-order HE requested address, there is no special process (the same value is maintained in the lowest-order HE requested address).

If the allocate request in S1 is LE (no in S1), a free area is searched for from the low address side (S7). The details of S7 are described later.

Then, the highest-order address of the area allocated in S7 is stored in the variable X (S8). The highest-order LE requested address is stored in the variable Y (S9).

Then, the variables X and Y are compared (S10). If X>Y (yes in S10), specifically the highest-order address of the allocated area exceeds the highest-order LE requested address, the value of the variable X (the highest-order address of the allocated area) is stored in the highest-order LE requested address (S11).

If X≧Y (no in S10), specifically the highest-order address of the allocated area does not exceed the highest-order LE requested address, there is no special process (the same value is maintained in the highest-order LE requested address).

Thus, in case of an HE requested (allocate request from the high address side), the lowest address of the previously allocated lowest-order addresses is stored in the lowest-order HE requested address. In the case of an LE requested (allocate request from the low address side), the highest address of the previously allocated highest-order addresses is stored in the highest-order LE requested address.

Figure 8:
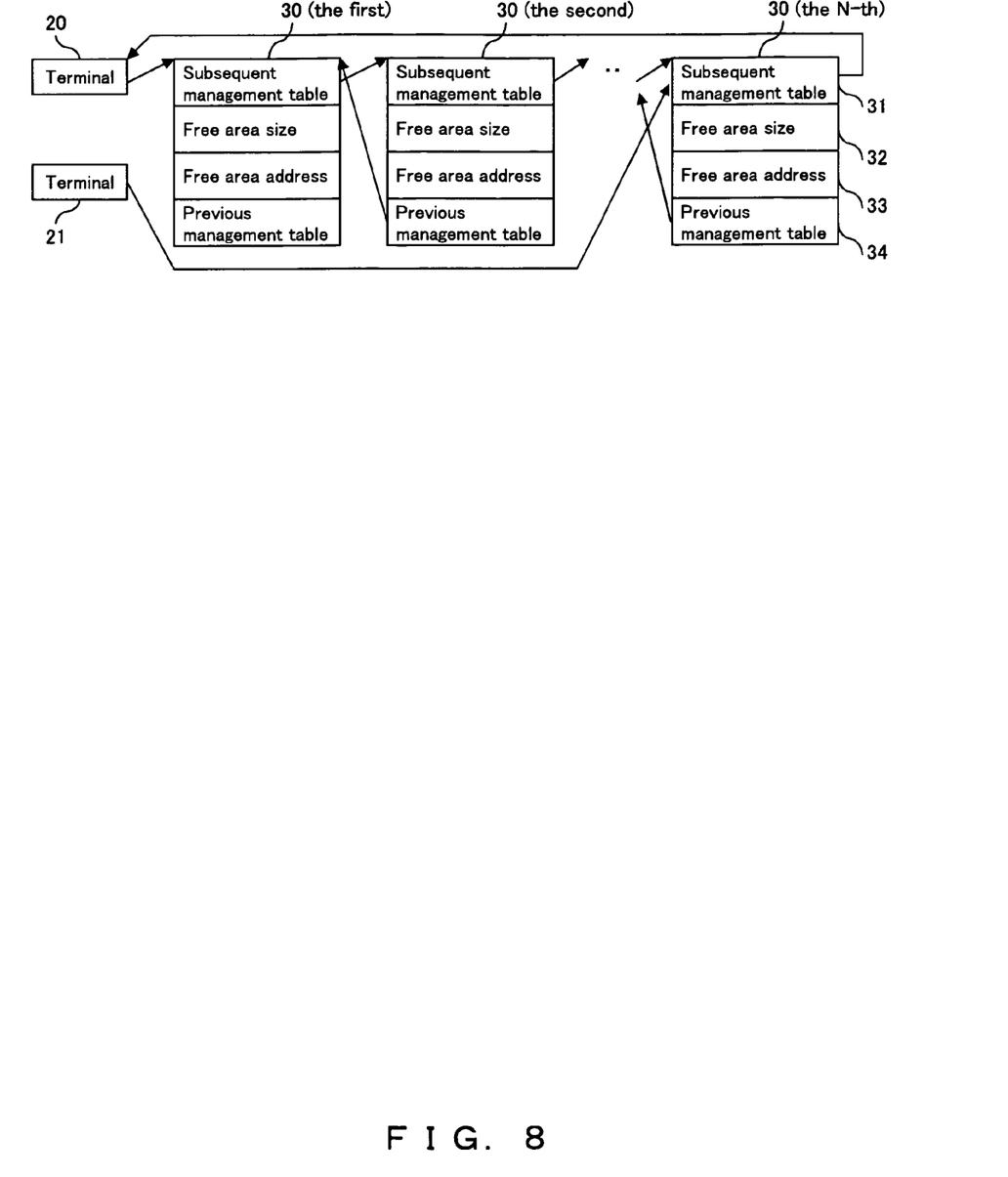
FIG. 8 shows an example of a management table for managing the free area of the memory in the preferred embodiment.

FIG. 8 shows an example of a management table for managing the free area of the memory in the preferred embodiment. A management table 30 is generated for each free area. The management table 30 manages free areas in address order and stores "free area addresses" and "free area sizes". The management table 30 also stores pointers for ascending/descending order and both directions in order to retrieve it.

In FIG. 8, there are N management tables 30, the first, the second, . . . , the i-th, which is not shown in FIG. 8, and the N-th. The management table 30 (the i-th) stores management information about a "subsequent management table" 31, a "free area size" 32, a "free area address" 33 and the "previous management table" 34.

The "subsequent management table" 31 stores a pointer to the subsequent management table 30 ((i+1)th order). The "previous management table" 34 stores a pointer to the previous management table 30 ((i−1)th).

The "free area address" 33 stores the addresses of free areas in the memory. The "free area size" 32 stores the size of the free areas.

A terminal 20 stores a pointer to the first management table 30. A terminal 21 stores a pointer to the N-th management table 30. The "subsequent management table" 31 of the N-th management table 30 stores a pointer to the terminal 20.

In this preferred embodiment, a management table (so-called memory map method) is used as a free area management method is used. However, the present invention is not limited to this, and for example, a list (chain) method. A bit map method or the like can also be used.

Figure 9:
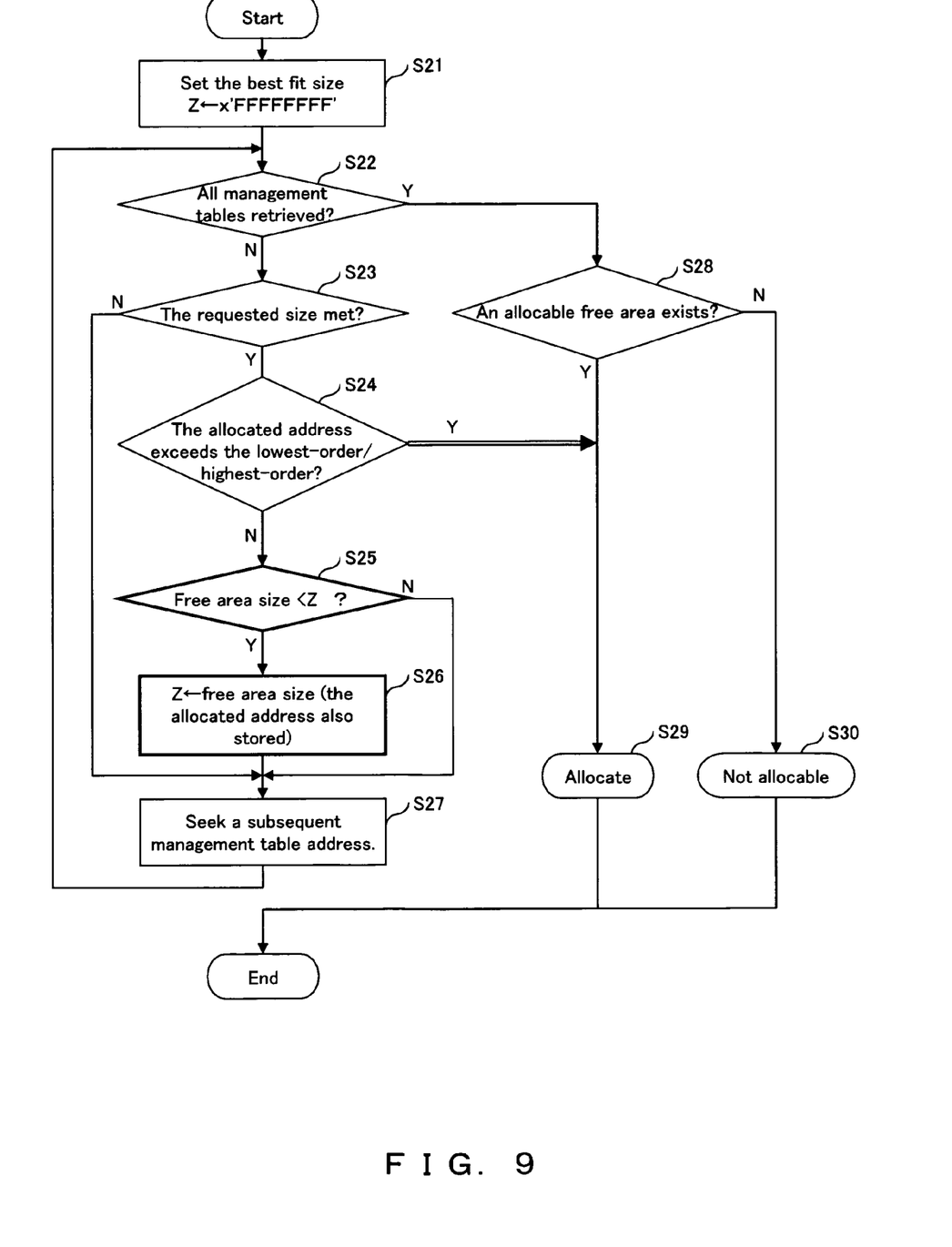
FIG. 9 shows the flow until allocating after receiving an allocate request in the preferred embodiment.

FIG. 9 shows the flow until allocating after receiving an allocate request in the preferred embodiment. This flow sequentially continues to read the management tables 30 shown in FIG. 8 and performs a loop process for each management table 30. This flow commonly responds either of HE/LE allocate requests. The flow can be called up in S2 and S7 shown in FIG. 7.

The difference between HE/LE requests is the difference between the ascending/descending orders of addresses in the retrieval direction of the management tables. Specifically, in the case of an LE requested, the management table 30 is retrieved from the first to the second, . . . to the N-th. In the case of an HE requested, the management table 30 is retrieved from the N-th to the (N−1)th, . . . , to the first.

In this flow, the size of a memory area requested by an allocate request (requested size) is represented by "Rs".

The case where the flow is called up from S7 shown in FIG. 7 (in the case of the LE requested), specifically, the case where the management tables 30 are retrieved in order from the first to the second, . . . to the N-th is described below.

Firstly, a variable Z is initialized by storing the maximum size (X'FFFFFF') of memory in the variable Z (S21). The variable Z sets a best fit size.

Then, it is determined whether all the management tables 30 are retrieved (S22). In this example, it is assumed that firstly the first management table 30 is retrieved. In this case, since all the management tables 30 are not retrieved yet (no in step S22), the flow proceeds to S23.

Then, it is determined whether the size stored in the variable Z meets the requested size Rs by LE request (S23). Since the maximum size (X'FFFFFF') is currently stored in the variable Z, the stored size meets the requested size (requested size Rs≦variable Z) (yes in S23) Therefore, the flow proceeds to S24.

Then, it is determined whether an allocated address exceeds the highest-order LE requested address (S24). In this case, the allocated address is a variable stored in the "free area address" in the i-th management table 30 (hereinafter called "variable W"), which is stored in S26 described later. At the time of the retrieval of the first management table 30, the allocated address W is initialized, for example, by X'00000000'.

In this case, since the allocated address W is lower than the highest-order LE requested address (does not exceed the highest-order LE requested address as a threshold) (no in S24), the flow proceeds to S25.

Then, it is determined whether the size V stored in the "free area size" 32 of the management table 30 to be currently retrieved is smaller than the variable Z (S25). If the free area size V is smaller than the variable Z (V<Z) (yes in S25), the free area size V is stored in the variable Z (S26). In this case, the "free area address" 33 of the management table 30 to be currently retrieved is stored in the allocated address W.

If the process in S26 is completed or the free area size V exceeds the variable Z (V≧Z) (no in S25), the address of the second management table 30 is sought by referring to the "subsequent management table" 31 of the management table 30 to be currently retrieved (S27) and the processes in S22 through S27 are repeatedly applied to the second management table 30.

Then, for example, if in S24 the allocated address W exceeds the highest-order LE requested address (yes in S24) when the i-th (i<N) management table is retrieved, the flow comes out of this loop process and the target program is applied to an address immediately after the highest-order LE requested address (S29)

If in S23 the variable Z stops meeting the requested size (requested size Rs>variable Z)(no in S23) when the j-th (j<N) management table 30 is retrieved, the (j+1)th management table address is sought (S27) by referring to the "subsequent management table" 31 of the j-th management table 30 and the retrieval process is similarly applied to the (j+1)th management table 30. If the (j+1)th management table and after are retrieved, in step S23 the flow proceeds to "no".

If the retrieval of all management tables 30 is completed (yes in S22), it is determined whether there is an allocable free area (S28). The allocable free area is a free area corresponding to the size value stored in the variable Z in step S26. If the process in S26 is performed (yes in S28), the target program is allocated to the allocated address W stored in S26 (S29).

If the process in S26 is not performed (no in S28), the target program cannot be allocated (S30) since there is no free area even when all management tables 30 are retrieved.

Next, the case where this flow is called up from S2 shown in FIG. 7 (in the case of the HE requested), specifically, the case where the management tables 30 are retrieved in order from the N-th to the (N−1)th, . . . , to the first is described.

Firstly, a variable Z is initialized by storing the maximum size (X' FFFFFFF') of memory in the variable Z (S21). In this case, since the N-th management table 30 is first retrieved (no in S22), the flow proceeds to S23.

Then, it is determined whether the size stored in the variable Z meets the requested size Rs by the HE request (S23). Since the variable Z currently stores the maximum size(X' FFFFFFF'), the stored size meets the requested size (requested size RS≦variable Z) (yes in S23). Therefore, the flow proceeds to S24.

Then, it is determined whether the allocated address W exceeds the lowest-order HE requested address (S24). When the N-th management table 30 is first retrieved, the allocated address W is initialized, for example, by X' FFFFFFF'.

In this case, since the allocated address W is lower than the lowest-order HE requested address (does not exceed the lowest-order HE requested address as the threshold) (no in S24), the flow proceeds to S25.

Then, it is determined whether the size V stored in the "free area size" 32 of the management table 30 to be currently retrieved is smaller than the variable Z (S25). If the free area size V is smaller than the variable Z (V<Z) (yes in S25), the free area size V is stored in the variable Z (S26). In this case, the "free area address" 33 of the management table 30 to be currently retrieved is stored in the allocated address W.

If the process in S26 is completed or if the free area size V is equal to or larger than the variable Z (V≧Z) (no in step S25), the address of the subsequent (N−1)th management table 30 is sought by referring to the "subsequent management table" 31 of the management table 30 to be currently retrieved (S27), and the processes in S22 through S27 are repeatedly applied to the (N−1)th management table 30.

Then, for example, if in S24 the allocated address W exceeds the lowest-order HE requested address (yes in S24) when the i-th (i<N) management table 30 is retrieved, the flow comes out of this loop process and the target data is allocated to an address immediately after the lowest-order HE requested address (S29).

For example, if in S23 the variable Z stops meeting the requested size (requested size Rs>variable Z) (no in S23), when the j-th(j<N) management table 30 is retrieved, the (j−1)th management table address is sought by referring to the "subsequent management table" 31 of the j-th management tables 30 and the (j−1) th management table 30 is similarly retrieved. If the (j−1)th, . . . , the second and the first management tables 30 are retrieved, in step S23 the flow proceeds to "no".

Then, if the retrieval of all the management tables 30 is completed (yes in S22), it is determined there is an allocable free area (S28). The allocable free area is a free area corresponding to the size value stored in the variable Z in S26. If the process in S26 is performed (yes in S28), the target data is allocated to the allocated address W stored in S26 (S29).

If the process in S26 is not performed (no in S28), the target program cannot be allocated (S30) since there is no free area even when all management tables 30 are retrieved.

In this way, before the allocated address exceeds the lowest-order HE requested address or the highest-order LE requested address as its threshold (no in S24), the loop process searches for an allocable area in the best fit mode. Then, if the allocated address exceeds the lowest-order HE requested address or the highest-order LE requested address as its threshold, the flow comes out of the loop process and the allocated address is searched for in the first fit mode instead of the best fit mode.

In this case, the higher is the lowest-order HE requested address or the lower is the highest-order LE requested address, the lower becomes the contribution ratio of the best fit mode and the higher becomes the contribution ratio of the first fit mode. Therefore, compared with when only the best fit mode is used, an area allocation time can be relatively reduced. Thus, not only its efficiency in use can be improved, but the efficiency of its allocation time can also be improved.

As described with reference to FIG. 6, before the lowest-order HE requested address and the highest-order LE requested address cross each other, an area between the lowest-order HE requested address and the highest-order LE requested address can becomes free. However, sometimes this free area is lost and the sizes of the lowest-order HE requested address area number and the highest-order LE requested address area number can be reversed. When the lowest-order HE requested address and the highest-order LE requested address cross each other, the best fit mode can also be switched to the first fit mode.

Figure 10:
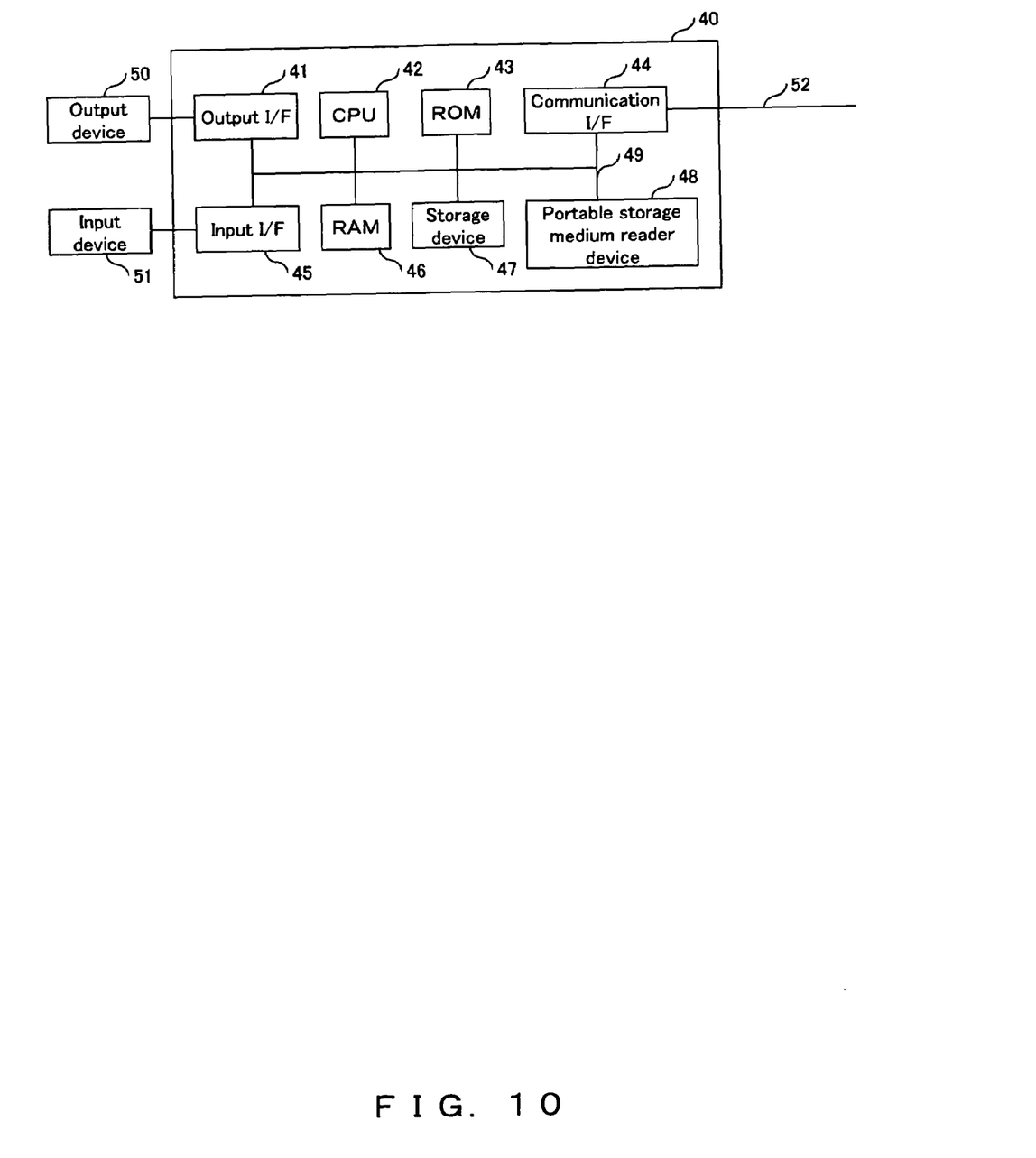
FIG. 10 shows the hardware configuration of the information processing system in the preferred embodiment.

FIG. 10 shows the hardware configuration of the information processing system in the preferred embodiment. In FIG. 10, an information processing system 40 comprises a CPU (control unit) 42, read-only memory (ROM) 43, random-access memory (RAM) 46, a communication interface (hereinafter an interface is omitted as "I/F") 44, a storage device 47, an output I/F 41, an input I/F 45, a portable storage medium reader device 48, a bus 49 to which all units and devices are connected, an output device 50 connected to the output I/F 41 and an input device 51 connected to the input I/F 45.

For the storage device 47, various types of storage devices, such as a hard disk, a magnetic disk and the like can be used. The storage device 47 or ROM 43 stores a memory area allocation control program used in the above-described preferred embodiment.

The program of this preferred embodiment can also be stored, for example, in the storage device 47 by a program provider via a network 49 and the communication I/F 44. Alternatively, this program can be stored in a portable storage medium sold and distributed in the market, be set in the reading device 48 and be executed by the CPU 42. For the portable storage medium, various types of storage media, such as CD-ROM, a flexible disk, an optical disk, a magneto-optical disk, an IC card and the like can be used. The program stored in such a storage medium is read by the reader device 48.

For the input device 51, a keyboard, a mouse, an electronic camera, a microphone, a scanner, a sensor, a tablet and the like can be used. For the output device 50, a display, a printer, a speaker and the like can be used. The network 49 can be the Internet, an LAN, a WAN, a dedicated line, a wired or wireless communication network.

According to the preferred embodiment, since the fragmentation of an area can be suppressed, an area can be effectively used. Furthermore, since an allocation place can be changed according to its usage, area breakdown can be prevented. For example, by locating a data area and a program area to the high address side and the low address side, respectively, the breakdown of the program area due to illegal writing into the data area can be prevented.

By adopting the present invention, an area can be efficiently allocated and by separating an allocation place according to its usage, data breakdown or the like can be prevented.

What is claimed is:

1. A memory area allocation control device for allocating target information to a free area of a memory area, comprising:
    an allocate request acquisition unit for obtaining a request for allocating the target information to the free area;
    a threshold address storage unit for storing a predetermined address as a threshold address;
    a free area retrieval unit for searching for the free area before exceeding the threshold address stored in the threshold address storage unit, by a best fit algorithm, according to the allocate request and retrieving it from an area after the threshold address by a first fit algorithm if there is no area to which the target information can be allocated in the area in memory searched by the best fit algorithm;
    an allocation unit for allocating the target information to the free area searched for by the free area retrieval unit;
    a threshold address setting unit for setting a final address in the area to which the allocation unit has allocated the target information, in the threshold address storage unit as the threshold address; and
    a retrieval direction determination unit for determining whether the allocate request obtained by the allocate request acquisition unit is a first allocate request for storing the target information in one end side of the memory or a second allocate request for storing the target information in the other end side, wherein
    if the final address in an area to which the allocation unit has allocated the target information exceeds the threshold address, the threshold address setting unit stores the final address in the threshold address storage unit as a threshold address.

2. The memory area allocation control device according to claim 1, wherein
    if the retrieval direction determination unit determines that the allocate request is the first allocate request, the free area retrieval unit searches for a free area from the one end toward the other end, and
    if the retrieval direction determination unit determines that the allocate request is the second allocate request, the free area retrieval unit searches for the free area from the other end toward the one end.

3. The memory area allocation control device according to claim 1, wherein
    the free area retrieval unit comprises
        a best fit retrieval unit for searching the free area by the best fit algorithm;
        a first fit retrieval unit for searching the free area by the first fit algorithm; and
        a retrieval switch unit for driving the best fit retrieval unit before exceeding the threshold address and driving the first fit retrieval unit when exceeding the threshold address, based on the allocate request.

4. The memory area allocation control device according to claim 1, wherein
    if the retrieval direction determination unit determines that the allocate request is the first allocate request, the free area retrieval unit searches for the free area from a high address side toward a low address side, and
    if a lowest-order address in an area to which the allocation unit has allocated the target information is lower than the threshold address, the threshold address setting unit stores the lowest-order address in the threshold address storage unit as a threshold address.

5. The memory area allocation control device according to claim 1, wherein
    if the retrieval direction determination unit determines that the allocate request is the second allocate request, the free area retrieval unit searches for the free area from a low address side toward a high address side, and
    if a highest-order address in an area to which the allocation unit has allocated the target information is higher than the threshold address, the threshold address setting unit stores the highest-order address in the threshold address storage unit as a threshold address.

6. A storage medium on which is recorded a memory area allocation control program for enabling a computer to execute a memory management process for allocating target information to a free area of a memory area, the process comprising:

an allocate request acquisition process for obtaining a request for allocating the target information to the free area;

a free area retrieval process for searching for the free area before exceeding a prescribed threshold address as a threshold address by a best fit algorithm, according to the allocate request and retrieving it from an area after the threshold address by a first fit algorithm if there is no area to which the target information can be allocated in the area in memory searched by the best fit algorithm;

an allocation process for allocating the target information to the free area searched for by the free area retrieval process;

a threshold address setting process for setting a final address in an area to which the target information has been allocated by the allocation process as the threshold address; and a retrieval direction determination process for determining whether the allocate request obtained by the allocate request acquisition process is a first allocate request for storing the target information in one end side of the memory or a second allocate request for storing the target information in the other end side, wherein if the final address in an area to which the target information has been allocated in the allocation process exceeds the threshold address, the final address is set as a threshold address in the threshold address setting process.

7. The storage medium according to claim 6, wherein if it is determined in the retrieval direction determination process that the allocate request is the first allocate request, the free area is searched for from the one end toward the other end in the free area retrieval process, and if it is determined in the retrieval direction determination process that the allocate request is the second allocate request, the free area is searched for from the other end toward the one end in the free area retrieval process.

8. The storage medium according to claim 6, wherein the free area retrieval process further comprising:

a best fit retrieval process for searching for the free area by the best fit algorithm;

a first fit retrieval process for searching for the free area by the first fit algorithm; and a retrieval switch process for performing the best fit retrieval process before exceeding the threshold address, and performing the first fit retrieval process when exceeding the threshold address, based on the allocate request.

9. The storage medium according to claim 6, wherein if it is determined in the retrieval direction determination process that the allocate request is the first allocate request, the free area retrieval process is performed from a high address side toward a low address side, and if a lowest-order address in an area to which the target information has been allocated in the allocation process is lower than the threshold address, the lowest-order address is set as a threshold address in the threshold address setting process.

10. The storage medium according to claim 6, wherein if it is determined in the retrieval direction determination process that the allocate request is the second allocate request the free area retrieval process is performed from a low address side toward a high address side, and if a highest-order address in an area to which the target information has been allocated in the allocation process is higher than the threshold address, the highest-order address is set as a threshold address in the threshold address setting process.

11. A memory area allocation control method for allocating target information to a free area of a memory area, comprising:

obtaining a request for allocating the target information to the free area;

searching for the free area before exceeding a prescribed threshold address as a threshold address by a best fit algorithm, according to the allocate request and retrieving the free area from an area after the threshold address by a first fit algorithm if there is no area to which the target information can be allocated in the area in memory searched by the best fit algorithm;

allocating the target information to the retrieved free area;

setting a final address in an area to which the target information has been allocated the allocation process as the threshold address; and determining whether the obtained allocate request is a first allocate request for storing the target information in one end side of the memory or a second allocate request for storing the target information in the other end side, wherein if a final address in an area to which the target information has been allocated exceeds the threshold address when setting the threshold address, the final address is set as a threshold address.

12. The memory area allocation control method according to claim 11, wherein if it is determined that the allocate request is the first allocate request, the free area retrieval is performed from the one end toward the other end, and if it is determined that the allocate request is the second allocate request, the free area retrieval is performed from the other end toward the one end.

13. The memory area allocation control method according to claim 11, wherein if it is determined the allocate request is the first allocate request when searching for the free area, the retrieval is performed from a high address side toward a low address side, and if a lowest-order address in an area to which the target information has been allocated is lower than the threshold address, the lowest-order address is set as a threshold address.

14. The memory area allocation control method according to claim 11, wherein if it is determined the allocate request is the second allocate request when searching for the free area, the retrieval is performed from a low address side toward a high address side, and if a highest-order address in an area to which the target information has been allocated is higher than the threshold address, the highest-order address is set as a threshold address.

* * * * *